UNITED STATES PATENT OFFICE.

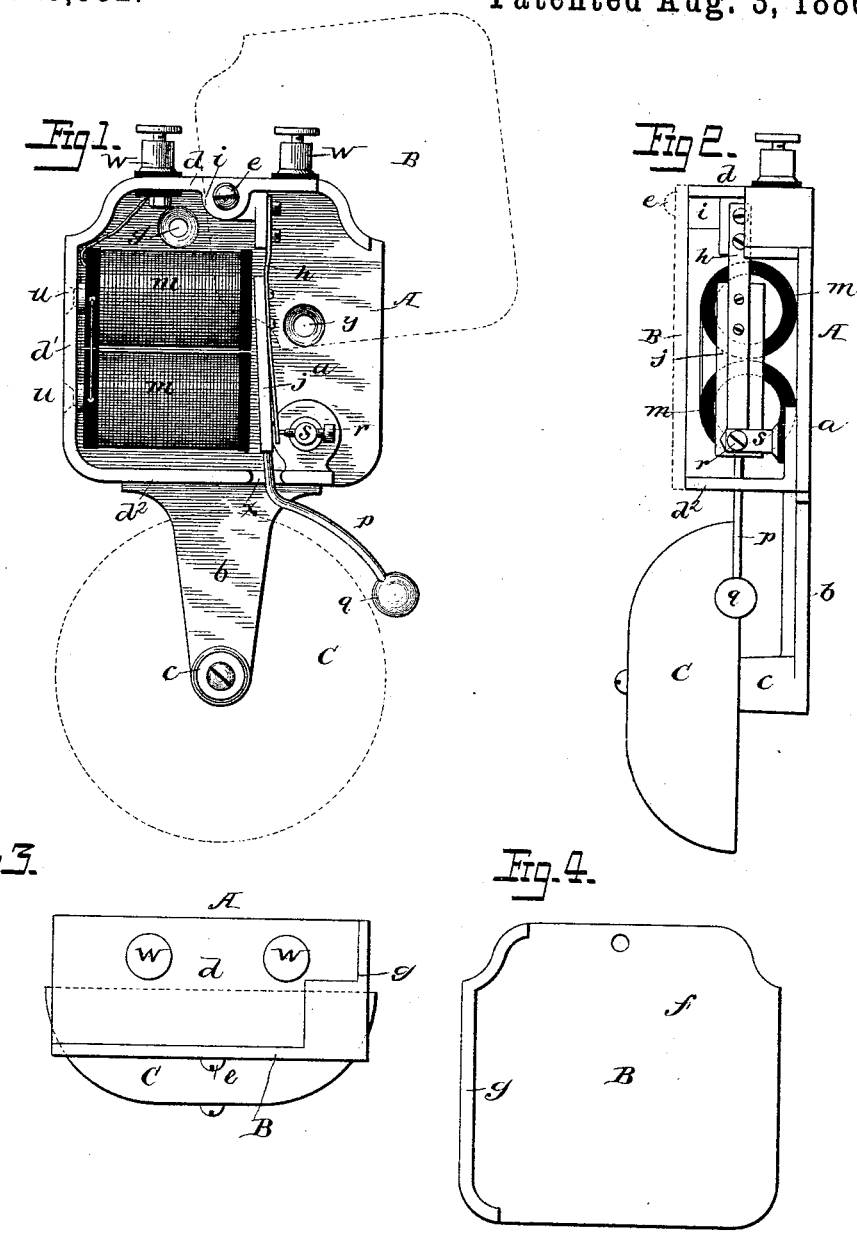

CHARLES H. CROCKETT AND CHANCELLOR C. ALLEN, OF BOSTON, MASS.

ELECTRIC ALARM.

SPECIFICATION forming part of Letters Patent No. 346,532, dated August 3, 1886.

Application filed January 6, 1886. Serial No. 187,813. (No model.)

*To all whom it may concern:*

Be it known that we, CHARLES H. CROCKETT and CHANCELLOR C. ALLEN, citizens of the United States, and residents of Boston, in the county of Suffolk, in the State of Massachusetts, have invented certain new and useful Improvements in Electric Alarms, of which the following is a specification.

Our invention relates to that class of electric calls or alarms in which a box containing a magnet, armature, and circuit-breaker supports a bell, and is provided with a movable cover; and our invention consists in constructing the said alarm so as to secure positive immovable bearings for the attached parts, and thereby prevent maladjustment of the latter and maintain the operative condition of the device.

In the drawings, Figure 1 is a side view of our improved alarm, the cover and bell being shown in dotted lines. Fig. 2 is an edge view, the cover removed. Fig. 3 is an end view. Fig. 4 is a reversed view of the cover.

The case consists, essentially, of the two parts, the box A and cover B. The box has a back plate, $a$, extended to form an arm, $b$, from which projects a pillar, $c$, supporting the bell C, and a flange projects at right angles from the back plate and forms the sides $d$ $d'$ $d^2$ of the box, the latter flange having a slot, $x$, for a purpose described hereinafter. The cover B consists of a flat plate, $f$, and a flange, $g$, the plate adapted to cover the space inclosed by the sides $d$ $d'$ $d^2$, and the flange $g$ forming a fourth side when the cover is in the position shown in Fig. 3. The cover is fitted detachably or movably to the box part. For instance, it is pivoted by a screw-pin, $e$, to a stud, $i$, formed on the flange side $d$, a flat side of the stud forming a bearing for the spring-plate $h$, carrying the armature $j$. The magnet-spools $m$ $m$ are secured to the side $d'$ by screws $u$, (dotted lines, Fig. 1,) extending through said side axially into the core of each spool, and the side, being of iron, becomes a yoke for the magnet-cores, thereby making the two cores form, practically, a horseshoe-magnet, and the shank $p$ of the hammer $q$ projects from the armature through the slot $x$, and is formed to support the hammer in proper position in respect to the bell. The circuit-breaker screw $r$ extends through a stud, $s$, projecting from the back plate, with its end adjacent to the free end of the spring-plate $h$. In the back plate are openings $y$ $y$, for the passage of screws for securing the alarm to its support, and in the side $d$ are openings to receive the screw-projections of binding-posts W W. The back plate, its flange or sides, and bearing-pieces $i$ $c$ are in one piece, and the bearings or attachments for the cover, armature-spring, magnets, and bell are thus invariably in place and incapable of getting out of position, so that after the parts are set thereon they cannot become maladjusted.

It is well known that the main cause of alarms of this character becoming inoperative is the displacement of the attached parts upon their bearings or the change in position of the latter from blows or the effects of heat or moisture. It will be evident that the fixed bearings, secured by casting the back piece with bearings for the attached parts, prevents this derangement of parts. By hinging the cap or cover to the back portion of the box, and by fitting said cover with a flange constituting one side of the box, the latter may be opened at front and side by moving the cover so as to permit ready access to the securing and adjusting screws.

It will be evident that a box thus made, in addition to the qualities specified, can be cheaply constructed, and that it may be molded or cast of metal, pulp, composition, or other suitable material, and that it may be varied in form without departing from the main features of the invention.

Without limiting ourselves to the precise construction and arrangement of parts shown, we claim—

1. A case for an electric call bell or alarm, consisting of a box portion, A, having a back plate and bearings in one piece therewith for the attached portions—to wit, the magnets, armature, bell, and binding-pillars — and a cover fitted movably to the box portion, substantially as described.

2. The case consisting of a back plate, flanges constituting sides of a box, and bearings $i$ $c$, all molded or cast in one piece, and a cover provided with a flange constituting one side of the box, molded and cast in one piece, and a magnet, armature, and bell secured to bearings of the case, substantially as described.

3. The box portion consisting of a back plate with a flange constituting sides $d\ d'\ d^2$, and a pillar, $c$, all in one piece, and a cover pivoted to the box part, and consisting of a plate having a flange constituting one side of the box, and a bell, magnet, armature, circuit-breaker, and binding-pillars, all secured to bearings of the case, substantially as described.

In testimony whereof we have signed our names to this specification in the presence of two subscribing witnesses.

CHARLES H. CROCKETT.
CHANCELLOR C. ALLEN.

Witnesses:
  CHARLES E. LOWD,
  FRANCIS BRYANT.